No. 833,941. PATENTED OCT. 23, 1906.
J. ROBERTSON & J. S. DELANEY.
INSTRUMENT FOR MEASURING LEATHER, &c.
APPLICATION FILED JUNE 15, 1906.

WITNESSES.
INVENTORS.

UNITED STATES PATENT OFFICE.

JAMES ROBERTSON, OF WOBURN, AND JOHN S. DELANEY, OF SOMERVILLE, MASSACHUSETTS.

INSTRUMENT FOR MEASURING LEATHER, &c.

No. 833,941.     Specification of Letters Patent.     Patented Oct. 23, 1906.

Application filed June 15, 1906. Serial No. 321,885.

*To all whom it may concern:*

Be it known that we, JAMES ROBERTSON, residing in Woburn, and JOHN S. DELANEY, residing in Somerville, in the county of Middlesex and State of Massachusetts, citizens of the United States, have invented certain new and useful Improvements in Instruments for Measuring Leather and other Sheet Material, of which the following is a specification.

This invention relates to an improved instrument or gage which is constructed and adapted for ascertaining the thickness of leather and other sheet material and for indicating the number of ounces to a square foot on a suitable scale.

The invention consists in the novel construction and arrangement of parts hereinafter described, and illustrated in the accompanying drawings, whereby a gage of this character is produced which is exceedingly simple, accurate, and not liable to get out of repair or to become easily injured or rendered inaccurate by ordinary use.

Figure 1:
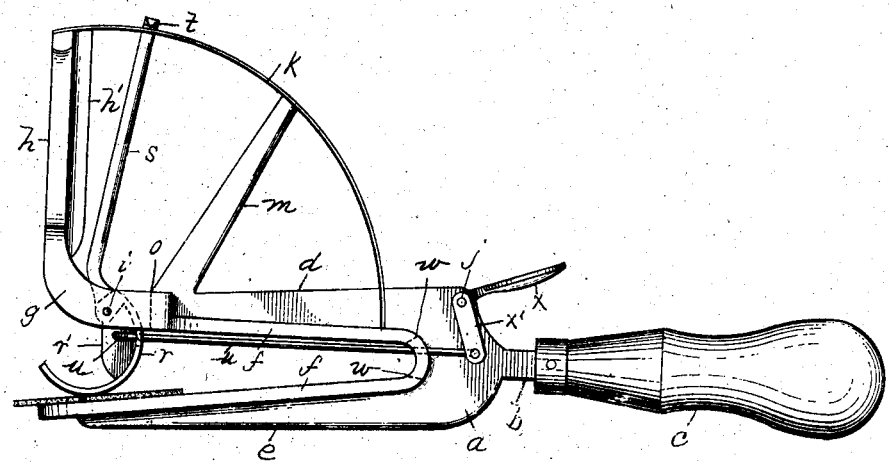
Figure 2:
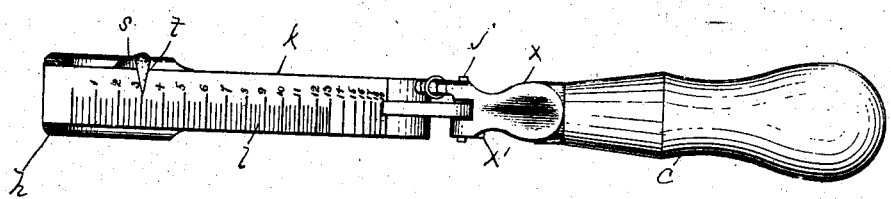
Figure 3:
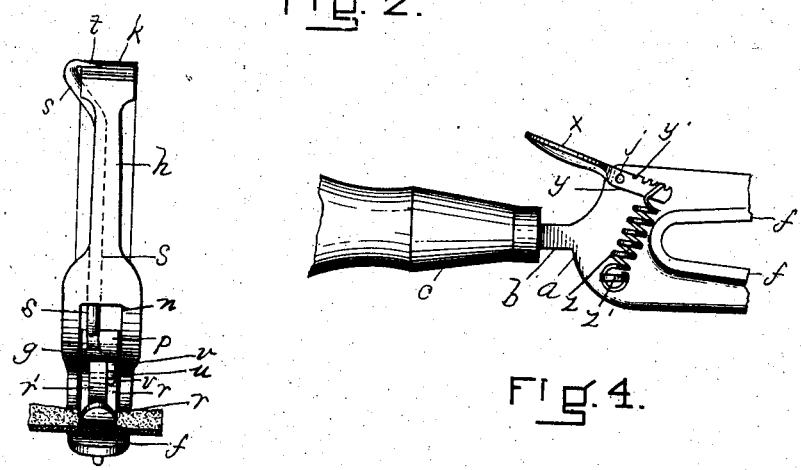
Figure 4:
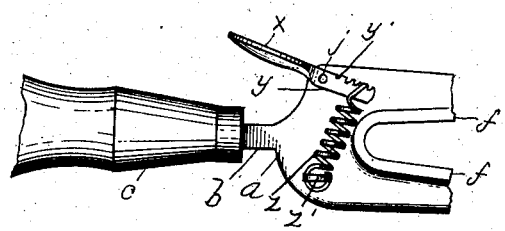

In the drawings, Figure 1 represents a side elevation of our improved instrument with a piece of leather applied for the purpose of measuring its thickness. Fig. 2 is a plan or top view of the same. Fig. 3 is an end elevation looking toward the right. Fig. 4 is an enlarged detail in rear elevation.

Similar letters of reference indicate corresponding parts.

*a* represents a vertical plate or frame, preferably a casting, provided at its rear end with a shank *b*, which extends into a suitable handle *c*. This casting is formed into stationary or rigid jaws *d* and *e*, whose inner edges are provided with flanges *f*. The upper jaw *d* is broadened at its outer end at *g* and formed at that point with an upturned vertical support *h*, which sustains at its upper end one end of a curved indicating-plate *k*, containing a scale *l*, said scale indicating in the present instance one ounce to a square foot of leather one sixty-fourth of an inch thick. The rear end of the curved plate *k* is rigidly secured to the upper jaw *d*, and it is centrally stiffened by means of a brace *m*, extending from said upper jaw. All the parts *a*, *b*, *d*, *e*, *f*, *g*, *h*, and *m* are integral and of a single casting.

The front or outer end of the portion *g* is provided with an opening or slot *n*, which extends from the point indicated in Fig. 3 in the vertical portion of the part *g* to the point in the horizontal portion of the said part indicated by the dotted line *o* in Fig. 1. Pivotally secured in said slot, by means of a pin *i*, is the upper end or hub *p* of a curved foot-piece *r*, and integral with said hub and foot-piece is a pointer *s*, which extends up therefrom and is adapted to be swung in a vertical plane. The upper end of the pointer is provided with an index or finger *t*, which extends over the scale *l*, and the pivot *i* is so located that as the curved foot-piece is swung forward and upward the finger of the pointer will swing close to the scale on the plate *k* and on an arc of a circle which is concentric with the arc described by said plate.

A rib *r'* is integral with the foot-piece *r*, hub *p*, and pointer *s* and is perforated to receive the bent end of a rod or wire *u*, which extends through a vertically-elongated slot *v* in the foot-piece *r* and a similar slot (indicated by broken lines *w* in Fig. 1) in the flange *f* and has its opposite end secured to the lower arm *x'* of a bent elbow-lever, comprising said arm *x'* and a thumb or finger piece *x* and pivotally secured at *j* to the rear or inner end of the jaw *d*, integral with the thumb-piece *x*, and extending therefrom on the opposite or rear side of the plate *a* (see Fig. 4) is an arm *y*, provided on its upper edge with notches *y'*, whereby said notched arm is connected by a spring *z* with a suitable stud *z'*, extending from the lower portion of the plate *a* and holding the thumb-piece normally raised. Integral with the upright portion *h* and on its rear or inner surface is a vertical rib or guard *h'*, which is made broader than the thickness of the pointer *s* for the purpose below described.

In operation when the thickness of a piece of leather or sheet material is to be measured the thumb-piece *x* is pressed down, swinging forward the arm *x'*, and by means of the rod or wire *u* swinging upward the curved foot-piece *r* on the arc of a circle of which the pivot *i* is the center, such arc being eccentric with the arc described by the shape of the foot-piece. The sheet material is then inserted, as shown in the drawings, and the foot-piece dropped upon it and held in position by the spring *z*, and the thickness of the material is indicated by the pointer *s*. The breadth and the curved shape of the foot-piece prevent it from indenting the leather when it swings down with its eccentric movement, and the measurement is thereby rendered exact. The fact that the foot-piece and the pointer are integral, or at least rigidly joined together, tends to enable the device to retain its accuracy. As it is convenient to hang up the instrument when it is not in use by catching it over a nail or hook, which would project through the space bounded by the upright *h*, brace *m*, and curved plate *k*, the above-described rib or guard *h'* is formed on the rear or inner surface of the portion *h* and is made thick enough to extend beyond the pointer *s* when the device is not in use. By this means when the instrument is hung up the pointer will be kept by said rib out of contact with the nail or hook on which it hangs, and thus be prevented from being injured or bent. In measuring sheets of hard or soft material, such as hard leather and metal or soft leather and felt, it is desirable that the pressure of the foot-piece should be adjusted so that there will be less pressure on a soft material than on a hard material, inasmuch as it is of course necessary that the foot-piece should not be forced with sufficient pressure against a sheet of soft material, such as felt, to sink into it or indent it. The pressure therefore may be regulated by moving the upper end of the spring *z* into the notches at a greater or less distance from the pivot *j*.

Having thus fully described our invention, what we claim, and desire to secure by Letters Patent, is—

1. In an instrument for measuring sheet material, a frame provided with rigid jaws between which the material is to be inserted, a curved foot-piece eccentrically pivoted to the upper jaw and extending normally toward the lower jaw, a curved plate provided with a scale supported by the frame, a pointer rigid or integral with the foot-piece and serving as an indicator for the scale, means for pressing the foot-piece against a sheet of material placed between it and the lower jaw, and means for regulating such pressure of the foot-piece.

2. In an instrument for measuring sheet material, a frame provided with rigid jaws between which the material is to be inserted, a curved foot-piece eccentrically pivoted to the upper jaw and extending normally toward the lower jaw, a curved plate provided with a scale supported by the frame, a pointer rigid or integral with the foot-piece and serving as an indicator for the scale, an elbow-lever pivotally connected with the frame, a link or rod pivotally connecting one arm of the elbow-lever with the foot-piece at a point which is between the curved portion of the foot-piece and its pivot, and means intermediate of said elbow-lever and the frame for holding the foot-piece normally down toward the lower jaw.

In testimony whereof we have signed our names to this specification in the presence of two subscribing witnesses.

JAMES ROBERTSON.
JOHN S. DELANEY.

Witnesses:
HENRY W. WILLIAMS,
A. K. HOOD.